Sept. 17, 1957 J. M. CARGILL 2,806,294
CONCENTRICITY GAGES FOR THREADED WORKPIECES
Filed March 8, 1956 3 Sheets-Sheet 1

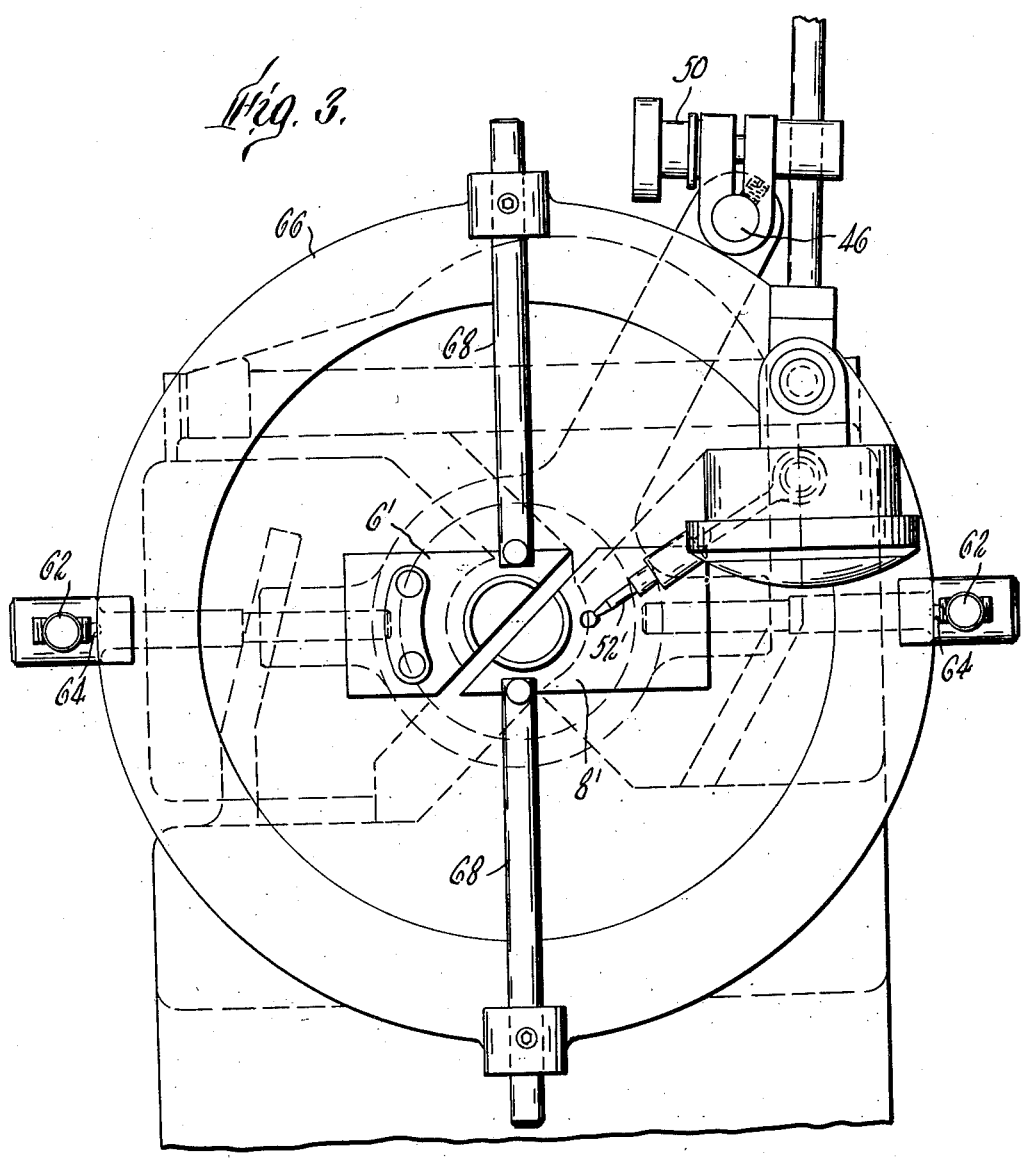

United States Patent Office 2,806,294
Patented Sept. 17, 1957

2,806,294

CONCENTRICITY GAGES FOR THREADED WORKPIECES

Jeffrey M. Cargill, Springfield, Vt., assignor to Bryant Chucking Grinder Company, Springfield, Vt., a corporation of Vermont Application March 8, 1956, Serial No. 570,376

8 Claims. (Cl. 33—199)

This invention relates to gages for workpieces and particularly to novel gages for gaging threaded workpieces while simultaneously gaging the concentricity of another portion of said workpiece.

It is an object of the invention to provide a gage of the type shown in copending application Serial No. 444,414, filed July 20, 1954, which is additionally capable of measuring the concentricity or runout of a surface portion of a threaded workpiece at a given distance from an end of the threaded workpiece as said workpiece is slowly rotated in contact with the threaded gage elements carrying it. Thus, the invention makes possible not only the gaging of the concentricity of cylindrical surface portions of a threaded workpiece, but also the gaging of the concentricity or runout of tapered or conical portions, since means are provided for moving the workpiece contacting indicating element axially of the workpiece as the threaded workpiece itself is moved axially by turning it in its supporting gage elements.

It is a feature of the invention that the gage structure provided is simple and rugged, as well as being highly accurate. Furthermore, the structure of the invention may readily be applied to existing gages such as those shown in said application.

For a complete understanding of further objects and features of the present invention, reference is now made to the following description of preferred embodiments of the invention, together with the accompanying drawings, wherein:

Fig. 3 is a partial plan view of the gage of Fig. 2.

Figure 1:
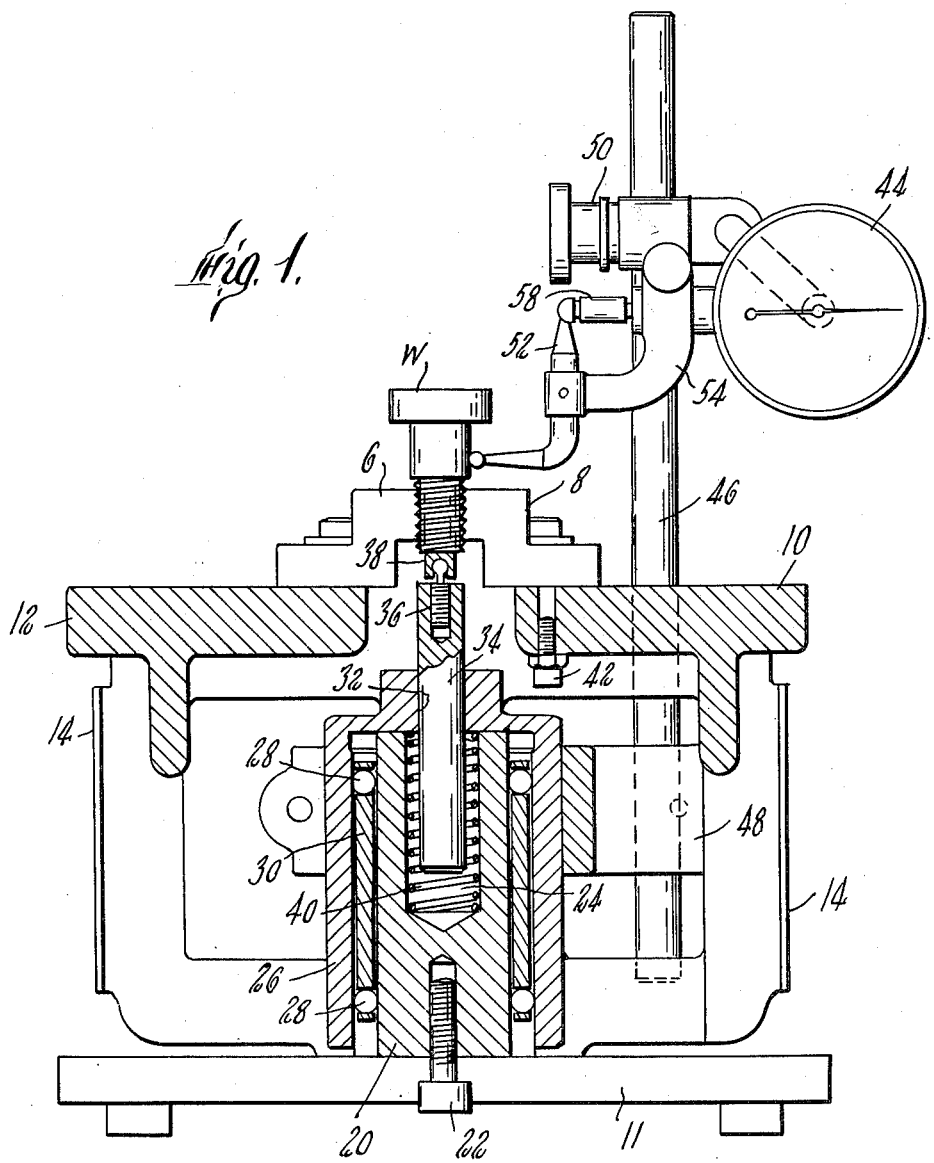
Fig. 1 is a cross sectional side view of a gage of the invention for gaging surfaces of externally threaded workpieces.

Referring to Fig. 1 wherein is shown a cross sectional side view of a gage for externally threaded workpieces, the basic gage structure, as shown and described in the said application, includes a main fixed frame 10 having a base 11 and a movable sub-frame 12, each including a gage element supporting member and being connected together by a pair of spaced parallel reeds 14 for relative movement. Each of the reeds 14 is secured at one end to the main fixed frame 10 and at the other end to the movable sub-frame 12, and extend generally along said frame 10 on opposite sides thereof. The reeds 14 are of substantial width, thus to provide a rigid and secure structure affording substantial resistance to relative motion of the members in a direction parallel to the plane of the reeds, but permitting the members to be moved relatively to one another in either direction from their neutral or rest position in a single plane perpendicular to that of the reeds, and in a substantially rectilinear direction. Said reeds 14 act as the sole support for said movable frame 12 and also as the sole means to urge said supporting members into gaging position, such gaging position normally being slightly displaced from the neutral position of the reeds, on either side of said neutral position, to provide the requisite gaging pressure.

On the upper portions of the fixed frame 10 and movable sub-frame 12 are provided gage element supporting members having relatively flat upper surfaces adapted to support suitable gage elements 6 and 8, said gage elements being mounted on said members by suitable machine screws (not shown) fitting into tapped holes in said support members. Since the gage shown in Fig. 1 is intended for external thread gaging, gage elements 6 and 8 have their shank portions internally threaded for gaging engagement with the external threads of a workpiece.

According to the present invention, means are provided for measuring the concentricity of a cylindrical surface of an externally threaded workpiece W at a predetermined distance from the workpiece end. Thus, a cylindrical post 20 is mounted on frame base 11 generally concentrically of the axis of said thread gage elements 6 and 8 (carrying workpiece W therebetween) by means of a suitable machine screw 22, said post having a central concentric bore 24 in its upper surface beneath said gage elements. A cylindrical sleeve 26 surrounds said post and is spaced outwardly therefrom, ball slide means including a plurality of preloaded balls 28 (ball bearing elements retained under a compression load) in a suitable retainer 30 being interposed between said post and said sleeve to provide for free movement of said sleeve in a direction perpendicular to the direction of motion of gage elements 6 and 8 along the axis of said elements. At the upper end of said sleeve is provided a concentric bore 32 having mounted therein a cylindrical stud 34 having a workpiece end face engaging element on its upper end. Such latter element preferably has a screw-threaded base portion 36 to provide vertical adjustability for setting the predetermined distance between the end of workpiece W and its cylindrical portion to be gaged and a head portion 38 mounted on said base portion by a ball and socket construction to provide self-alining motion of the end of said head portion in contact with the end face of workpiece W. A coil spring 40 is positioned in bore 24 between sleeve 26 and post 20 for urging said sleeve 26 carrying head portion 38 upwardly into contact with the end face of workpiece W, a machine screw 42 being provided on base 10 as a stop for adjustably limiting the upward extent of movement of said sleeve.

For indicating the concentricity of the cylindrical portion of workpiece W, a dial indicator 44 is carried by said sleeve by means of an indicator support rod 46 clamped at its lower end in a bracket 48 on sleeve 26. Dial indicator 44 is mounted on the upper portion of said rod by a suitable clamp 50 and carries actuating lever 52 pivotally mounted in a bracket 54 fixed on dial indicator 44, one end of said actuating lever engaging the surface of said workpiece and the other end engaging the dial indicator operating stem 58.

To simultaneously gage the cylindrical surface of the workpiece W while gaging its threaded portion, said workpiece is inserted between gage elements 6 and 8 in the usual manner so that it will be carried thereby. When so inserted, the end face of workpiece W will be engaged by sleeve head portion 38 to determine the distance between said end face and the cylindrical portion of workpiece W to be engaged by the end of dial indicator actuating lever 52 engaging the workpiece surface. As the workpiece W is rotated to examine its threaded portion by the movement of gage elements 6 and 8 toward or away from one another as detected by a suitable dial indicator (not shown), the axial movement of the workpiece caused by the rotation of its threaded portion relative to threaded gage elements 6 and 8 will cause sleeve 26, carrying the workpiece engaging end of dial indicator actuating lever 52, to be moved axially by the same amount, so that the distance between the end of the workpiece and the smooth portion of the workpiece to be gaged as to concentricity will remain constant. Thus, the concentricity as well as the diameter or axial run out even of tapered, conical or flat surfaces, may be gaged. The self-alining mounting of the workpiece end face engaging head portion 38 provides an average measurement of the distance between the workpiece end and the portion to be gaged so that accurate concentricity or other measurements may be made irrespective of run out of the workpiece end engaging said portion.

Figure 2:
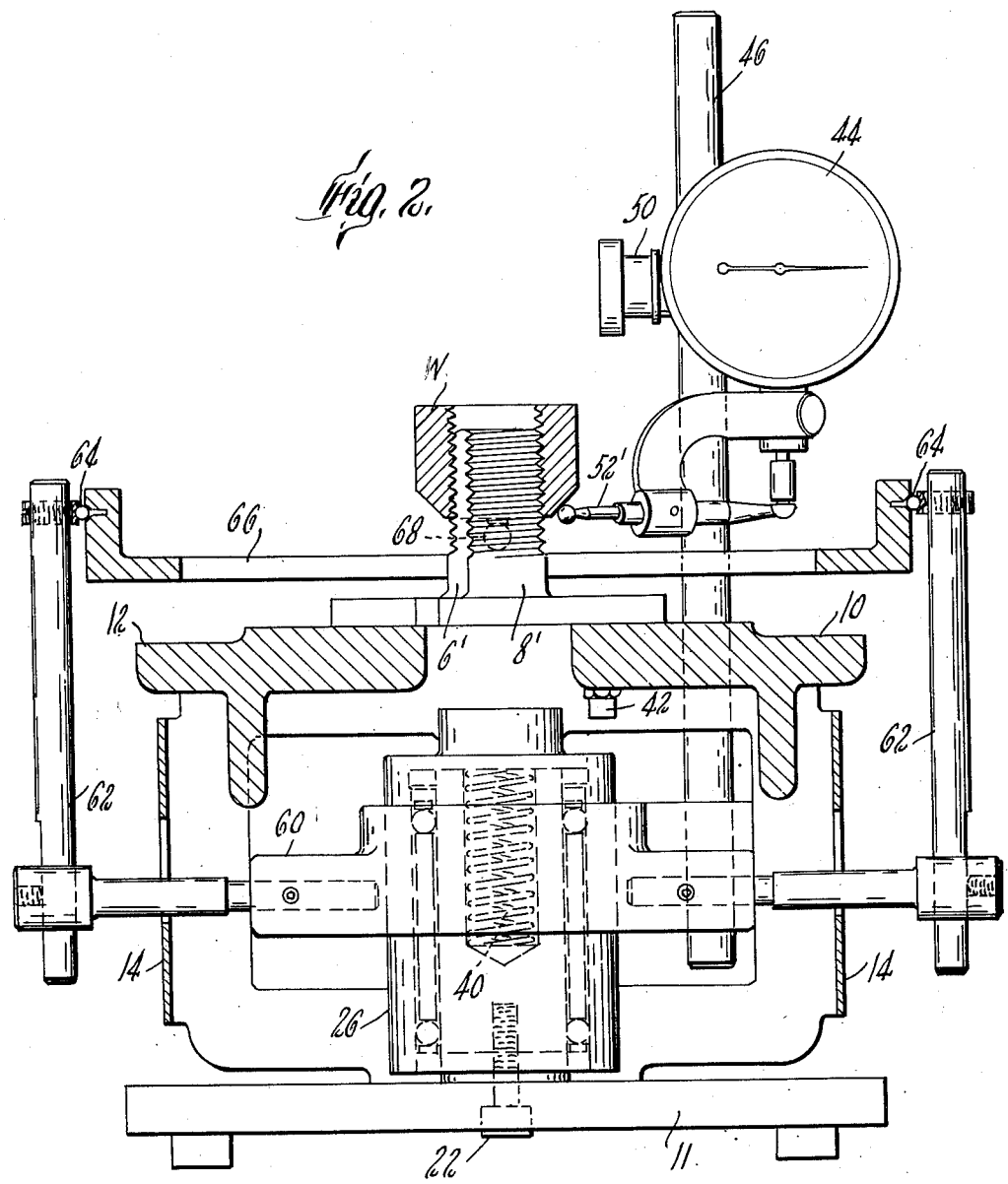
Fig. 2 is a cross sectional side view of a gage of the invention for gaging surfaces of internally threaded workpieces.

In Figs. 2 and 3 is shown a gage for internally threaded workpieces, said gage having a structure essentially the same as that shown in Fig. 1 except that novel ring means are provided for engaging the external end face of an internally threaded workpiece W' supported on internal gage elements 6' and 8', the dial indicator 44 has been repositioned and a modified lever 52' provided for indicating the runout of a tapered surface of said workpiece W', and the central workpiece engaging means of Fig. 1 is omitted. Accordingly, reference numerals identical to those of Fig. 1 have been applied to corresponding elements.

Thus, internal gage elements 6' and 8' are mounted on the gage element supporting members as before for carrying a workpiece W' having an internally threaded bore and a smooth tapered surface to be gaged. For engaging the end face of said workpiece to axially move the end of the dial indicating lever 52' in contact with the tapered or conical surface of said workpiece as it is rotated about gage elements 6' and 8', the sleeve 26 of the ball slide means has mounted thereon a bracket 60 carrying a pair of posts 62 at opposite sides thereof. Said posts each have a pivot 64 at their upper ends supporting a ring 66 having an axis concentric with the axis of workpiece W' carried by the gage elements 6' and 8' for tilting movement about a pivot axis perpendicular to said workpiece and thread gage element axis. The ring 66 has a pair of inwardly extending arms 68 rigidly mounted thereon, the free ends of said arms contacting the end face of said workpiece on opposite sides thereof along a line perpendicular to said pivot axis. The dial indicator 44 is mounted on its support rod 46 by its clamp 50 but is repositioned so that its indicating stem 58 is parallel to the workpiece axis to indicate runout rather than concentricity as when its indicating stem is perpendicular to the workpiece axis, as in Fig. 1 described above, and its actuating lever 52' is straight and positioned generally perpendicular to the workpiece axis, rather than being bent and positioned generally parallel to the workpiece axis as in Fig. 1.

In operation, with the workpiece W' carried by the externally threaded gage elements 6' and 8', the end face of said workpiece will be engaged by the free ends of inwardly extending arms 68 on ring 66, the average movement of said arms as the workpiece W' is moved axially by rotating it being transmitted through pivots 64 to move the workpiece contacting end of dial indicator actuating lever 52' by the same amount so that the average distance between the end face of the workpiece and the surface to be measured will be maintained, while any runout of said end face will simply result in tilting ring 66 without transmitting any axial motion to lever 52'. Thus, such self-alining motion provides an accurate measure of the runout and an indication of the concentricity of the tapered surface or of a flat surface of a workpiece at a constant average distance from the end face of the workpiece, irrespective of the runout of said end face.

It will be seen that the invention provides novel gages for measuring the concentricity as well as other dimensions of a workpiece carried thereby. Various modifications of my invention not herein set forth, within the spirit of the invention and the scope of the appended claims, will occur to those skilled in the gage art.

I claim:

1. A gage comprising a frame, a pair of gage element supporting members mounted on said frame, one of said supporting members being maintained in fixed position relative to said frame and the other maintained in movable position relative to said frame, gage elements on each of said supporting members, means supporting one of said members for motion relative to the other of said members to open and closed positions of said gage elements, means mounted on said frame and having a workpiece end face engaging element movable in a direction perpendicular to the direction of motion of said members for engagement with an end face of a workpiece carried by said gage elements, and indicating means carried by said workpiece end face engaging element and movable therewith responsive to a dimension of a gage supported workpiece at a predetermined distance from the workpiece end engaged by said workpiece end face engaging element.

2. A gage as claimed in claim 1 wherein said means mounted on said frame includes a self-alining portion for engagement with said workpiece end face.

3. A gage as claimed in claim 1 wherein said gage elements are threaded for gaging a threaded workpiece.

4. A gage comprising a frame, a pair of gage element supporting members mounted on said frame, one of said supporting members being maintained in fixed position relative to said frame and the other maintained in movable position relative to said frame, thread gage elements on each of said supporting members, a pair of reeds arranged in parallel relation, one end of each of said reeds being secured to one end of each of said members, said reeds supporting one of said members for yielding substantially rectilinear motion relative to the other of said members in a direction to move said gage elements toward and away from one another to open and close said gage elements, ball slide means mounted on said frame and having a workpiece end face engaging element movable in a direction perpendicular to the direction of motion of said members, and indicating means carried by said workpiece end face engaging element and movable therewith responsive to a dimension of a gage supported workpiece at a predetermined distance from the workpiece end engaged by said workpiece end face engaging element.

5. A gage as claimed in claim 4 further including spring means for urging said end face engaging element into contact with said workpiece end face.

6. A gage as claimed in claim 4 wherein said ball slide means includes a cylindrical post mounted on said frame generally concentrically of the axis of said thread gage elements carrying a workpiece therebetween, cylindrical sleeve means surrounding said post and spaced therefrom, and supporting said workpiece end face engaging element, and said ball slide means comprising a plurality of preloaded balls interposed between said post and said sleeve.

7. A gage as claimed in claim 4 wherein said workpiece end face engaging element includes an axially adjustable stud positioned centrally of said ball slide means for engaging the end face of a workpiece having an external threaded surface.

8. A gage as claimed in claim 4 wherein said workpiece end face engaging element includes ring means having an axis generally coincident with the axis of said thread gage elements carrying a workpiece thereon and pivotally mounted for tilting movement about an axis perpendicular thereto, said ring means having inwardly extending arms for contacting the end face of an internally threaded workpiece carried by said gage elements on opposite sides thereof along a line perpendicular to said pivot axis.

References Cited in the file of this patent

UNITED STATES PATENTS

| | | |
|---|---|---|
| 2,700,224 | Johnson | Jan. 25, 1955 |
| 2,725,637 | Johnson | Dec. 6, 1955 |
| 2,770,050 | Johnson | Nov. 13, 1956 |